(No Model.)

E. BAER.
BOLT HOLDER.

No. 429,786.           Patented June 10, 1890.

Attest:
A. N. Jesbera
E. M. Watson.

Inventor:
Edward Baer
By David A. Burr
Atty.

UNITED STATES PATENT OFFICE.

EDWARD BAER, OF NEW YORK, N. Y.

BOLT-HOLDER.

SPECIFICATION forming part of Letters Patent No. 429,786, dated June 10, 1890.

Application filed September 26, 1889. Serial No. 325,144. (No model.)

*To all whom it may concern:*

Be it known that I, EDWARD BAER, of the city, county, and State of New York, have invented a new and useful Improvement in Bolt-Holders; and I do hereby declare that the following is a full and exact description thereof, reference being had to the accompanying drawings, and to the letters of reference marked thereon, making a part of this specification.

This invention relates to an improved device for preventing the turning of a loose threaded bar or bolt in its bearings in order to permit of the removal of a nut screwed up thereon.

The devices heretofore constructed have depended upon a frictional pressure created between the head of the bolt, or an offset or collar thereon, and an underlying seat or bearing, in order to fix the bolt and hold it fast while the nut is being loosened and screwed off; but these devices are inefficient at times because of the difficulty in thus fixing the bolt by a frictional contact alone, and wholly fail in cases where the bolt is loose and is without a head, or where the contacting surfaces are lubricated, as is the case with the end of an axle broken off in a wheel.

My invention furnishes a clamping device which will operate unfailingly with all forms of bolts whose two ends are exposed; and it consists in the combination, with a suitable frame or bearing-plate and devices for attaching the same to the object through which the bolt is passed, of screws having pointed ends, led transversely through said body at an inclination to each other, so that their ends shall converge to a common center, at or near which they admit of being made to strike the end of the bolt to be freed, so as to engage the same at two different points, thereby obtaining a firm hold thereon in manner to prevent a rotation thereof.

Figure 1:
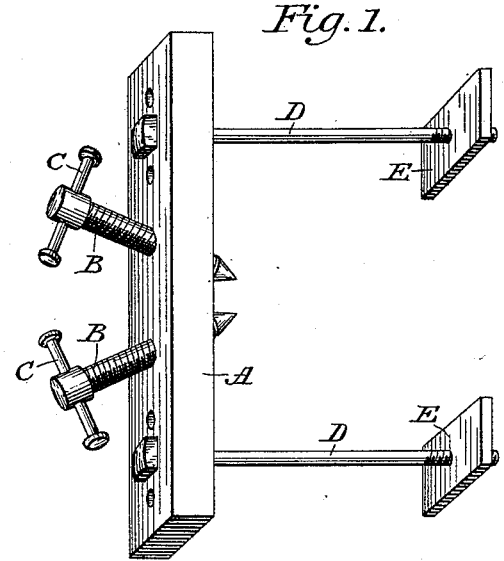
Figure 2:
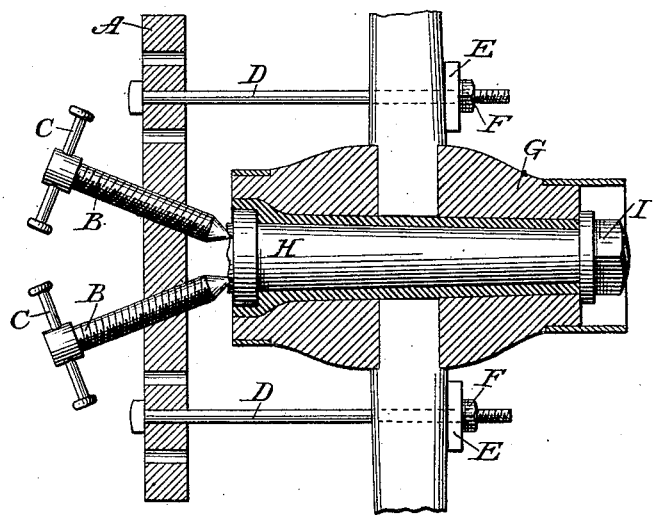

In the accompanying drawings, Figure 1 is a view in perspective of my improved clamp or bolt-holder. Fig. 2 is a sectional view of the same as applied to the broken end of an axle in the hub of a wagon-wheel to hold the end while its nut or cap is unscrewed.

In the drawings, A represents the body portion or bearing-plate of the bolt-holder. It consists, preferably, of a stout plate of wood or metal made thick enough to furnish suitable bearings for the holding-screws B B. If the bearing-plate be made of metal, the screw-bearings therein may be lengthened by forming suitable bosses on the plate to thicken the same at the bearing-points, and the weight of the plate may be lightened by suitable openings therein, so as to impart thereto the character of an open frame-work instead of a solid plate. The holding-screws B B are made to work through threaded apertures or bearings formed in the plate A, each at an angle with the face thereof, so that the screws shall be made to converge and their points be brought into contact at a central point removed from the face of the bearing-plate. The converging ends of the screws are each tapered to a sharp point and hardened to enable them to penetrate more or less deeply the surface against which they may be forced. The outer end of each screw is fitted with a transverse bar or lever C, by which it may be readily turned.

To each end of the bearing-plate A, carrying the holding-screws B B, one or more rods or bars D D are secured to extend outwardly therefrom on each side of the screws beyond the points thereof. The outer ends of these rods or bars may be bent to form hooks adapted to take hold of the spokes of a wheel, or may be threaded to receive nuts F F, whereby clamp-plates E E, fitted upon the rods, may be adjusted and held against the spokes after the rods have been passed between them, as shown in Fig. 2.

In the use of the device to hold fast the end of a broken axle remaining within the box of a wheel the supporting bars or rods D D are passed between the spokes of the wheel on each side of the hub G, and the points of the screws B B are made to bear against the broken end of the piece of axle H. The clamp-plates E E are then fitted in place against the spokes and the nuts F F screwed up, so as to tighten the plates E and screws B and take up all lost motion between them, and, finally, the screws B are each turned by means of their levers C until their points are driven more or less into the axle, so as to get a bite thereon. As each screw thus engages the axle end at a different point, the two will when fixed prevent a rotation of the axle, so that the cap or nut I on its outer end may be then readily removed.

In the use of the device for removing tire-bolts the bearing-plate A is provided with two supporting-rods D at each end instead of one, both passing through a single transverse clamp-plate E, and these clamp-plates are severally fitted transversely against the inner side of the felly of the wheel on each side of the bolt to be withdrawn, so that the screws B B may be brought to bear against the head of the bolt.

It is evident that the number of converging screws B B may be increased where the exigencies of the work require it.

I claim as my invention—

1. In a device for holding bolts, &c., from turning, the combination, with a bearing-plate and devices, substantially as described, for supporting the same, of screws having pointed ends, and which work through said plate in the same direction at an angle with each other to converge at a common point, substantially in the manner and for the purpose herein set forth.

2. The combination of the plate A, the screws B B, working through said plate and converging toward a common center beyond it, the supporting bolts or bars D D, the clamp-plates E E, adjustable thereon, and the nuts F F to confine the same, substantially in the manner and for the purpose herein set forth.

In testimony whereof I have signed my name to this specification in the presence of two subscribing witnesses.

EDWARD BAER.

Witnesses:
A. N. JESBERA,
E. M. WATSON.